A. A. GLENZ.
SHIELD FOR TRANSMISSION GEARING OF AUTOMOBILES.
APPLICATION FILED FEB. 3, 1912.
1,042,548.
Patented Oct. 29, 1912.
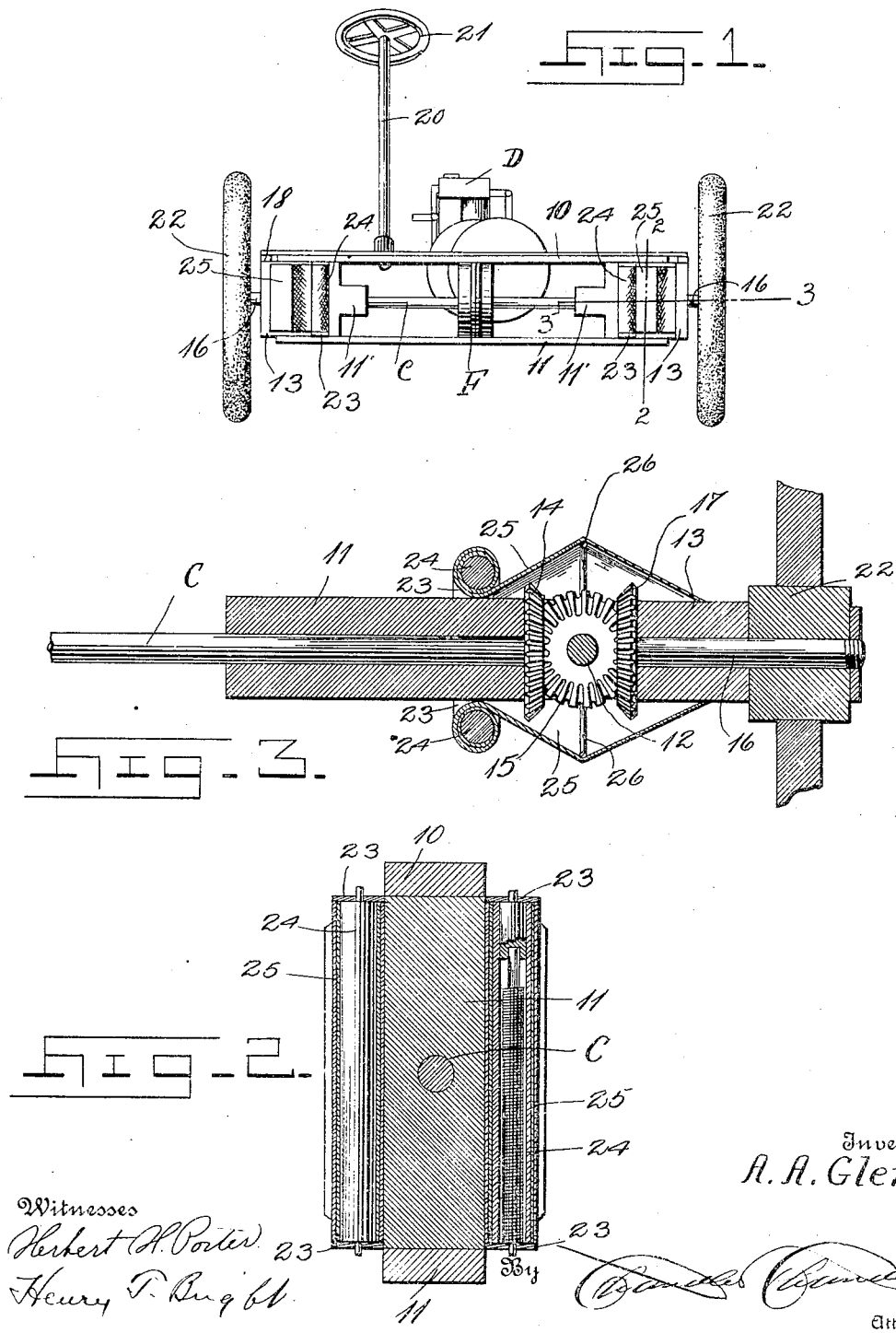

UNITED STATES PATENT OFFICE.

ALBERT A. GLENZ, OF FALL CREEK, WISCONSIN.

SHIELD FOR TRANSMISSION-GEARING OF AUTOMOBILES.

1,042,548.   Specification of Letters Patent.   Patented Oct. 29, 1912.

Application filed February 3, 1912. Serial No. 675,239.

*To all whom it may concern:*

Be it known that I, ALBERT A. GLENZ, a citizen of the United States, residing at Fall Creek, in the county of Eau Claire, State of Wisconsin, have invented certain new and useful Improvements in Shields for Transmission-Gearing of Automobiles; and I do hereby declare the following to be a full, clear, and exact description of the invention, such as will enable others skilled in the art to which it appertains to make and use the same.

This invention relates to shields for transmission gearing of automobiles and particularly to that type of gearing in which the driving of the automobile is effected through connections between the engine shaft and the front axle.

The object of the invention resides in the provision of a shield which covers the gear connections between the front axle and the front wheel and which will permit a free swinging of said wheel during the steering operation.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a front view of an automobile with the body removed and having the invention associated therewith. Fig. 2 an enlarged section on the line 2—2 of Fig. 1, and Fig. 3 an enlarged section on the line 3—3 of Fig. 1.

Referring to the drawings C indicates the front axle of an automobile, same being of the divided type and driven through connection with a suitable motor D supported upon the automobile frame and having its drive shaft operatively connected with a differential gear shown typically at F and associated with the adjacent ends of the front axle C in the usual manner. The forward end of the automobile frame comprises parallel spaced members 10 and 11 which have mounted therebetween adjacent each end bearings 11', in which is rotatably mounted the front axle C. Pivotally mounted between the members 10 and 11 at each end of the latter upon a shaft 12 are the arms of a U-shaped knuckle 13, said shaft 12 having its ends non-rotatably mounted in the members 10 and 11. Fixed on each end of the front axle C is a beveled gear 14 which meshes with a beveled gear 15 loosely mounted on the adjacent shaft 12. Rotatably mounted in the knuckle 13 is a stub shaft 16 which has fixed on its inner end between the arms of said knuckle, a beveled gear 17 in mesh with the adjacent beveled gear 15. Fixed on each knuckle 13 is a steering arm 18, and these steering arms 18 of respective knuckles 13 are mutually connected by a cross rod 19 which in turn is operatively connected to a steering shaft 20 controlled by a hand wheel 21. Mounted upon each of the stub shafts 16 is a front wheel 22 which is suitably keyed to its respective stub shaft so as to rotate with the latter. Journaled in suitable brackets 23 on the inner and outer edges of the members 10 and 11 at each end of the latter are spring controlled rollers 24. Each of these rollers has secured thereto one end of a sheet of flexible material 25, and the other ends of these sheets are suitably secured to opposite sides of the adjacent knuckle 13 so as to cover the gears 14, 15 and 17 which are disposed adjacent thereto. Mounted upon the front and rear sides of each knuckle 13 is a U-shaped frame 26 which is adapted to hold the adjacent sheet 25 out of engagement with the gears 14, 15 and 17 during the swinging of the knuckle 13 on the shaft 12. As previously mentioned the rollers 24 are spring controlled, after the manner of an ordinary curtain shade roller, and that as the result of such spring control the sheets 25 will be automatically wound and unwound upon and from respective rollers 24 during the movement of the adjacent knuckle 13 upon the shaft 12 during the operation of steering. By this construction it will be apparent that the gears 14, 15 and 17 at each end of the axle C will be at all times protected from dirt by the sheets 25 and that said sheets will in no way hinder the free operation of the steering knuckles 13.

What is claimed is:

In a motor vehicle, the combination of a frame, an axle journaled upon the frame, a knuckle pivotally mounted upon the frame at each end of the axle, a wheel rotatably mounted on each knuckle, connections between each wheel and the axle whereby the rotation of the latter will rotate the former, spring controlled rollers mounted upon the frame at each end of and on opposite sides of the axle respectively, flexible shields mounted to wind upon the unwind from said rollers respectively, and having their free ends connected to opposite sides of the adjacent knuckle whereby said shields will inclose said connections and permit free swinging of the knuckle.

In testimony whereof, I affix my signature, in presence of two witnesses.

ALBERT A. GLENZ.

Witnesses:
HENRY BRUESEWITZ,
O. P. BRUESEWITZ.